United States Patent Office

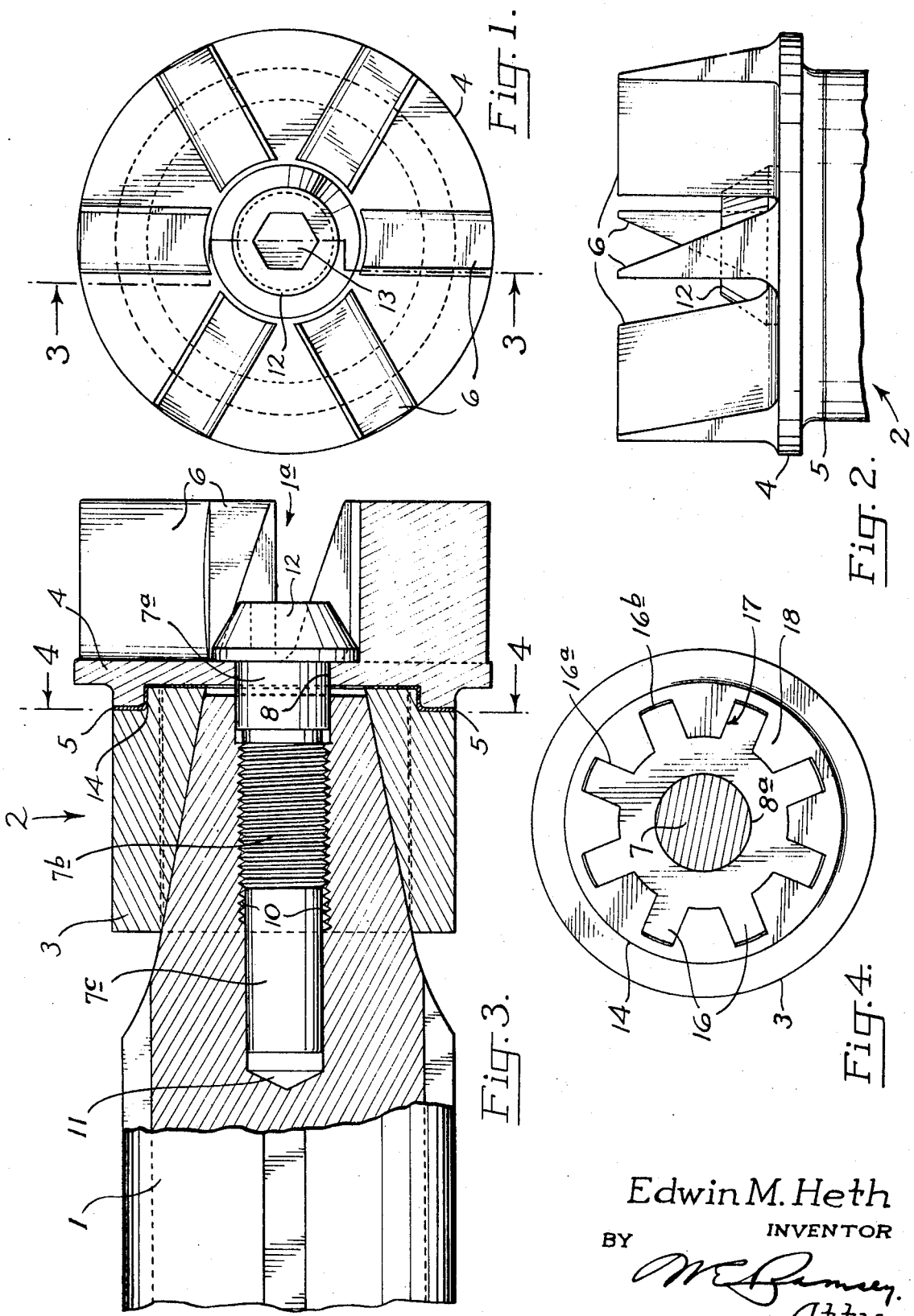
Edwin M. Heth
INVENTOR

3,513,891
Patented May 26, 1970

3,513,891
CHUCK FOR VENEER LATHE INNER SPINDLE
Edwin M. Heth, Portland, Oreg., assignor to Production Machines, Inc., Portland, Oreg., a corporation of Oregon
Filed June 16, 1967, Ser. No. 646,531
Int. Cl. B271 5/02, 7/04
U.S. Cl. 144—209     5 Claims

ABSTRACT OF THE DISCLOSURE

This development concerns the construction of a veneer lathe for an inner and outer spindle in which the inner spindle has a detachable chuck plate and collar bonded together to permit their separation under certain conditions, to enable the chuck plate to be replaced if it becomes unduly worn, or damaged, the parts being easily separable to permit said replacement.

---

My invention relates to an inner chuck spindle for a double chuck veneer lathe. The details and the mode of operation of such a lathe are described in my U.S. Pat. No. 3,110,330, that issued Nov. 12, 1963, and entitled Mounting for Lathe Spindles. Reference is made to the discussion of the operating problems and the details of construction of such a lathe.

Although an inner chuck for holding one end of a log being peeled may be replaced by pulling it for replacement, this is quite an expensive and time-consuming operation. The part that usually needs replacement is the chuck plate that has bits formed thereon that actually project into and hold the log to rotate it. Wear, physical damage and breakage shortens the operating life of such chuck plate. Many efforts have been made to provide detachable chuck plates, particularly for the inner spindle, but none has proven satisfactory. Bolt-joining the chuck plate to the spindle places too much stress upon the fastening bolts. Screw threads require that the opposed inner spindles must be made opposite hand to prevent one of them becoming disengaged from its spindle. Keying the parts together requires that loose keys be provided. These keys work loose and permit relative rotation or differential movement of the chuck plates or their spindles. Non-circular mounts tend to round off and thus loosen their tight interfit and also produce radial instability. If threaded fasteners are provided therewith, the inherent rigidity of said mounting is lost and welding them in place makes removability difficult, if not impossible. Even with the best choice of the foregoing structures, removal is difficult because operating forces wedge and fix the parts together so solidly that if they do not work loose, to be inoperative or unstable, they have to be beaten off of the spindle due to the severe forces that they have to resist.

I have discovered that an inner spindle chuck can be constructed of two separable halves, comprising a disc-type plate and a collar secured thereto. The two halves may be readily separated from each other by joining them together by the use of a silver solder joint. Silver solder is the preferred material, but many adhesives that solidify and produce secure adhesion, may be used. The two parts are joined together in a furnace by stacking them axially on top of each other and subjecting them to an elevated temperature equalling the fluxing temperature of the adhesive. After they have been cooled to atmospheric pressure, the bond is adequate to transmit torque from one half to the other. When a chuck unit has to be removed for repair or replacement, this can be done by releasing the chuck unit from its fastened connection to the spindle and then placing it in a furnace and re-heating the two parts until the temperature is raised to melt the solder and the parts may then be separated by tapping or jogging.

I have determined that the collar portion and the end of the spindle upon which the chuck unit is to be mounted, must have a complementary angular tapered fit of such amplitude that it exceeds a non-locking mating angle (that I have determined to be about 10°). This pemits the collar to be tapped or jogged from the chuck plate without marring or defacing the collar.

Further details of construction of a chuck of this character for the inner spindle of a veneer lathe, are described with reference to the accompanying drawings, in which:

FIG. 1 is an end elevation of a chuck face of a device embodying my invention taken in the direction of arrow 1 in FIG. 3;

FIG. 2 is a side elevation of the chuck plate and its support collar with the latter shown broken away;

FIG. 3 is a transverse section of a spindle, and said chuck plate assembly shown mounted thereon taken on the line 3—3 in FIG. 1; and FIG. 4 is a transverse section looking at the end of the collar portion of the chuck assembly, taken on the line 4—4 of FIG. 3.

My invention relates to a removable chuck for a veneer lathe and particularly for the inner spindle thereof. In FIG. 3, the terminal or inboard end 1a of an inner spindle 1 is illustrated. A normal spindle frequently does not have a tapered end, as is shown in FIG. 3. The chuck is formed integrally therewith. In my invention, the chuck assembly 2 is illustrated as being made of two parts, namely a collar 3 and a chuck plate 4. These are joined together by a thin layer of silver solder 5. The chuck plate is provided with teeth or bits that are arranged in an annular course arranged axially of the plate, as is illustrated in FIG. 2. The conformation of the teeth forms no part of my invention. The pattern illustrated is typical of various teeth or bit arrangements in such a chuck.

As is described in my U.S. Pat. No. 3,110,330, a pair of spindles move axially toward and from each other under power to bite into, and grip, the ends of a log to be peeled in the lathe. Thus, the chuck assembly and the spindles carrying it must sustain severe longitudinal pressure when forced into the end grain of a log. Primarily, however, much greater stress is resisted when turning said log during the peeling operation. Torque tends to twist the chuck teeth or bits from their backing plate. Also, wood tends to plug the spaces between the teeth or bits and the central aperture about which the teeth or bits are formed. It is common practice to pick out bits of wood from the chuck by the use of so-called pickaroon, which is a sharp pointed instrument. Frequently the wood is missed and the point of the pickaroon tends to deface or break the teeth or bits.

An elongated stud 7 is passed end first through a hole 8 arranged centrally in the chuck plate. The stud has a shank of stepped form having three successive diameters. The outer end 7a is of the largest diameter. The intermediate portion 7b is smaller in diameter and the inner end 7c forms a stub pilot element. The inner end of the spindle is counterbored with a hole 8a of complementary form, as is shown in FIG. 3, to accommodate the three different diameters of the length of the stud. The hole 8 provides a loose fit about the outer end of the stud. In the counterbored portion in the shaft, however, it provides a tight fit so that the stud is not subject to flexure or gyration which might tend to cause it to break under repeated reverse flexure.

The intermediate portion 7b of the stud shaft is threaded with a very fine thread and this is meshed with tapping 10 in the spindle. The pilot element 7c fits tightly within an aperture 11, which has close tolerance with said stud to inhibit relative movement. Thus the stud is held in the hole 8a close to its head 12 by the close fit to the right of the tapping 10 as illustrated in FIG. 3. It is screw-fitted into the tapping 10 and the stud pilot elements 7c fits tightly in the aperture 11.

To accommodate any variation in the mounting, the outer end 7a is a little shorter than the portion of the aperture in which it is fitted and the same thing is true with regard to the stud pilot element 6c in its aperture 11. Thus, if it is necessary to cinch down on the stud, this can be accomplished without limit within the degree of play provided, which is approximately one-half of the thickness of the chuck plate 4. The head 12 of the stud is preferably frusto-conic form, as is illustrated in FIG. 3, so as to provide clearance for removal of wood that might become embedded within the teeth or bits of the chuck plate. In the stud head 12 is a non-circular aperture 13, used to turn the stud into gripping position in the tapping 10 and also to back it off to separate the chuck assembly from the spindle when this is desired.

The joint between the chuck assembly and the collar has a stepped parting line 14 normal to the axis of the stud and in this parting line the thin layer of silver alloy 5 is laid to join the chuck assembly with its collar. Although I prefer silver alloy because it has a relatively sharp temperature of fusion and is quite tenacious and bonds readily to the interfaces of the collar and the chuck plate, I do not wish to limit myself to this specific securing material. Silver solder melts at about 1250° F., which is also its temperature of fusion. This soldering operation is performed by placing thin strips of silver solder between the opposed faces of the chuck plate and its collar, as is illustrated in FIG. 3. Then by standing the collar on end in a furnace and weighting down the chuck plate, while raising the temperature to about 1250° F., the solder is caused to melt and fuse in position. When the soldered chuck element is removed from the furnace and permitted to regain atmospheric temperature, the parts are tightly bonded, one with the other. If a chuck plate becomes broken or damaged, the chuck assembly is removed and the parts are placed on the floor of the furnace and their temperature raised to about 1250° F. where the solder melts and releases its adhesive bond. Tapping or jolting the chuck causes the two parts readily to separate without hammering or prying. The injured chuck plate may be discarded and a new one substituted and bonded, as has been described, to the old collar, which may be retained and reused.

The inner end 1a of the spindle is tapered at an angle of approximately 10° from the longitudinal center line and the bore of the collar is tapered to a complementary degree. The spindle is provided with plural splines 16 with parallel sides and with an external tip formation, as is shown in dotted lines in FIG. 3. Thus, the splines vary from full depth at the outer end of the spindle to nothing at the opposite face of the collar. The same is true of the complementary grooves 17 formed in the bore of the collar. As is shown in FIG. 4, the sides 16a of the spline 16 are parallel and the grooves in which they fit are similarly formed. The tips 16b of the splines do not engage the bottom of the complementary grooves in the collar. Between the splines, the lands 18 between the grooves are tightly fit so that there is no bearing through the tips. This diminishes the area of contact of the parts to permit easy removal and also assures that true radial bearing is exerted through the tips of the spindle splines against the collar, thus to produce balanced radial bearing between these parts.

I claim:
1. A removable chuck for a veneer lathe inner spindle, comprising
   an integral chuck plate and an annular collar soldered thereto by bonding material having a temperature of fusion of approximately 1250° F.,
   said spindle having plural axially extending splines distributed circumferentially about its periphery, the annular collar having elongated spline-reclining grooves extending along its bore snugly receiving the splines of said spindle and permitting axial shifting of the collar on the spindle,
2. The organization defined in claim 1 in which the bonding material is silver solder.
3. The organization defined in claim 1 in which the spindle splines have plane, parallel side portions and non-bearing tips, the annular collar grooves having bottoms free of engagement with said spline tips,
   lands between said annular collar grooves having no clearance with respect to the portions of the spindle splines lying between said spindle splines, thereby to produce radial bearing through the lands lying between the spindle splines.
4. The organization defined in claim 1 in which the central portion of said chuck plate is apertured and the end of said spindle as internally threaded thereon and is aligned with the apertured chuck plate,
   and an elongated, headed, threaded fastening stud extending through the apertured chuck plate and engaging the internal threads end of said spindle.
5. The organization defined in claim 1 in which the central portion of said chuck plate is apertured and the end of said spindle as internal threads and is aligned with the apertured chuck plate,
   and an elongated, headed, threaded fastening stud extending through the apertured chuck plate and engaging the internal threads of said spindle,
   the internally threaded end of said spindle having three successive diameters, an exterior counterbore, internally threaded intermediate portion and a pilot hole, all being in axial alinement, the exterior counter bore having the largest diameter, the tapped intermediate section being of smaller diameter, and the pilot hole having a still smaller diameter,
   and the elongated fastening stud having complementary portions to engage the corresponding portions of the internally threaded spindle end.

References Cited
UNITED STATES PATENTS

| | | | |
|---|---|---|---|
| 1,368,035 | 2/1921 | Kay | 142—53 |
| 2,879,816 | 3/1959 | Cook et al. | 144—209 |
| 3,110,330 | 11/1963 | Heth et al. | 144—209 |

DONALD R. SCHRAN, Primary Examiner

U.S. Cl. X.R.

142—53